United States Patent [19]

Bretti et al.

[11] Patent Number: 4,908,911
[45] Date of Patent: Mar. 20, 1990

[54] METHOD AND APPARATUS FOR AUTOMATICALLY BINDING CABLES, BY A CONTINUOUS STRIP

[75] Inventors: Carlo Bretti; Franco Sermidi, both of Milan, Italy

[73] Assignee: R.T.A. Italiana S.p.A., Milan, Italy

[21] Appl. No.: 205,663

[22] Filed: Jun. 13, 1988

[30] Foreign Application Priority Data

Jul. 1, 1987 [IT] Italy ................................ 21143 A/87

[51] Int. Cl.⁴ ............................................. B21F 9/02
[52] U.S. Cl. ............................. 24/16 PB; 140/93 A; 140/93.2; 140/123.6
[58] Field of Search ................ 140/93 A, 93.2, 123.5, 140/123.6; 24/585, 30.5 P, 22, 16 PB

[56] References Cited

U.S. PATENT DOCUMENTS

| | | | |
|---|---|---|---|
| 3,747,164 | 7/1973 | Fortsch | 24/16 PB |
| 4,119,124 | 10/1978 | Collier et al. | |
| 4,495,972 | 1/1985 | Walker | |
| 4,573,242 | 3/1986 | Lankton et al. | 24/30.5 P |
| 4,610,067 | 9/1986 | Hara | |
| 4,640,319 | 2/1987 | Walker | |
| 4,680,834 | 7/1987 | Andre et al. | |

FOREIGN PATENT DOCUMENTS

| | | |
|---|---|---|
| 2429190 | 1/1975 | Fed. Rep. of Germany ... 24/16 PB |
| 3146678 | 9/1982 | Fed. Rep. of Germany . |
| 1226687 | 4/1986 | U.S.S.R. . |
| 1068993 | 5/1967 | United Kingdom . |

*Primary Examiner*—Lowell A. Larson
*Attorney, Agent, or Firm*—Beveridge, DeGrandi & Weilacher

[57] ABSTRACT

A method and an apparatus for automatically binding bundles of electric cables.

According to this invention, a plastic strap in the form of a continuous serrated band is advanced by means of a feeding and pulling mechanism along guides and through a hollow retaining element provided with a similar indentation and fed in the form of a continuous strip of retaining elements. The plastic strap is advanced until the bundle of cables has been wrapped, and the end of the serrated band is reinserted through the opposite side of the retaining element. The binding is tightened by reversing the operation of the pulling mechanism until the cables are pulled together; the serrated band is then cut performing a binding stretched to the desired value.

24 Claims, 10 Drawing Sheets

METHOD AND APPARATUS FOR AUTOMATICALLY BINDING CABLES, BY A CONTINUOUS STRIP

BACKGROUND OF THE INVENTION

This invention refers to the binding of electric conductors, and the like, placed together in a bundle; in particular, it applies to a method and to an automatic apparatus capable of positioning a portion of a plastic strap supplied in the form of a continuous band that is automatically fed by passage through a plastic head or hollow retaining element supplied as a continuous strip until it wraps the bundle of cables with a portion of the band, the ends of which are clamped by a retaining element; a compact binding is thus obtained that is stretched to the desired value. Previous automatic devices for binding cables made use of a loading mechanism containing a number of separate shaped bands of fixed length which were fed in succession to a distributing device that was part of the apparatus.

The use of a loader for feeding bands to an automatic device to achieve the binding of cables, gives rise to working difficulties which impair the efficiency of the apparatus. Any type of apparatus which makes use of a loader is limited to the application of as many bands per cable as can be held by the loader that, when empty, must be replaced with a full one every time the previous one becomes exhausted, or it must be reloaded with new straps properly oriented and compatible with the particular type of distributor of the apparatus.

Practical limitations due to the size of the bands and to the necessity of using a portable device, easy to handle where space is at a premium, have restricted to 100 the number of bands for each loader.

Other previous automatic devices for binding cables made use of preformed straps with a preset length, held in a parallel position by means of a supporting strip wound as a coil with a large number of strps. The straps are fed by a secondary and separate device connected to a tube for feeding the portable apparatus for binding cables.

The secondary device was used for supporting the coil of straps, for separating one of them from the supporting strip at every cycle and for feeding it, through a channel, to the portable apparatus.

Still other devices for binding cables with preformed fixed-length straps, made use of a very large loading device placed on a secondary apparatus that, for each cycle, had to feed the portable applicator through a connecting tube.

All previous devices, whether using a loader or a secondary feeding mechanism, hence at an additional cost, make use of preformed straps of preset length consisting of a flexible portion (tongue) and one for clamping (head).

The strap, fed from a loading device or from a secondary apparatus, was made to advance inside the portable applicator by means of mechanical devices that were very complex, had to be very precise and, hence, were very expensive to manufacture.

The straps, thus fed by means of the portable applicator, wrapped the bundle of cables positioned across the axis of the device, while running through a guiding channel; the end of the flexible portion of the strap (tongue) would pass through the clamping section (head) to be engaged by an internal device within the applicator which stretched the tongue until the bundles of cables had been clamped within the desired value.

Once the clamping had been achieved, an additional device inside the portable applicator would cut the excess portion of the tongue; this had to be expelled in such a way as to avoid the blockage of the guiding channel which would have, otherwise, prevented the correct positioning of the strap to be used next.

Such a system required interacting movements and mechanical elements driven by very complex pneumatic or electro-pneumatic actuators which were the cause of frequent obstructions and subsequent loss of efficiency. For those reasons, previous cable binding devices required the use of straps of preset length, fit to cover a range between minimum and maximum diameters; this arrangement led, invariably, to the waste of a portion of the tongue, the length of which was a function of the diameters of the bundles of cables.

This excess portion of the tongue, not only constituted a waste and, hence, an additional cost, but could also jam the apparatus and become a nuisance to the surrounding electrical equipment, because of the excess materials produced falling from the straps.

To avoid this inconvenience, some previous devices made use of special containers connected to the portable applicator which, however, due to the difficulties of maneuvering this type of machinery in small spaces, presented the problem that the rejected portion of the tongue might be caused to bounce and to return inside the apparatus. This occurrence would lead to the jamming of the apparatus, particularly when it had been rotated through 90° or more for the binding of vertical bundles. Another difficulty with previous devices is due to the fact that the use of pneumatic equipment interacting with various mechanical elements, makes the equipment extremely delicate; the correct operation of the equipment, in fact, depends on the quality of the pneumatic control and driving components, which are usually highly delicate, so any small pressure variation may upset the synchronism of the various movements. This may jam the mechanism and break some of the internal mechanical components, thus necessitating expensive maintenance and loss of efficiency.

An object of this invention, therefore, is to provide an automatic cable-binding apparatus which makes use of a special binding device that includes a correctly dimensioned and specially profiled plastic strap that automatically couples with a retaining element, also made of plastic material and constructed in such a way that the two joined elements, for each working cycle, adjust to the size of the bundle and bind it to the desired degree of tightness.

Another object of the invention is to provide an automatic cable-binding device capable of a large number of successive bindings by automatically feeding the binding elements supplied in the form of a continuous band, for the plastic strap, and of a strip, for the retaining element.

Another object of this invention is to provide an automatic cable-binding apparatus with a mechanism controlled by an electric motor and, hence, without pneumatic driving devices; this eliminates all problems connected with the availability of compressed-air lines, and with the safety of the operation in as much as the apparatus makes no use of fast-acting mechanical elements for power transmission that may cause injury to the operator.

Another object of the present invention is to provide an automatic apparatus for binding cables which utilizes the exact quantity of plastic strap according to the diameter of the bundle to be bound. This avoids waste of material, does not require the expulsion of scrap and does not create pollution problems.

Another object of the present invention is to provide an automatic cable binding apparatus of reduced dimensions, light and handy, for the binding of cables where space is limited, as it would inside electrical equipment.

Yet another object of this invention is to provide an automatic cable binding apparatus driven by a low-voltage electric motor, that interacts with simple and sturdy mechanical elements and is easy to maintain so as to reduce manufacturing and operating costs.

The automatic apparatus for binding cables according to the method of this invention, includes a mechanism made of a series of interacting linkages and a motor-driven mechanism which, working together during every cycle, allow for: the advance of a strip made of many toothed retaining elements, the separation of one of them and its alignment for matching with a toothed or serrated binding strap which is made to advance automatically by the electric motor, by inserting the end of the strap through the retaining element, in the pushing direction, until the end of the strip, as it runs inside a guide, wraps the bundle of cables and is reinserted through the opposite side engaging the inside of the toothed retaining element; the stretching of the strip until the cables are tightened within the set value; and the cutting of the strip to perform a binding for every working cycle.

The plastic strap, used with the automatic apparatus for the binding of cables, is in the form of a continuous rectangular-shaped hand having, on one of its major sides, a series of indentations, along two parallel lines, with opposing teeth.

The retaining plastic element used in the automatic binding apparatus, is made of a molded strip composed of several elements joined together by an intermediate portion.

The retaining element has an approximately square shape, it is hollow along the axis and is provided, internally, with two flexible and opposing arms with a set of teeth properly sized to match the indentations of the plastic strap.

The matching of the retaining teeth on the indentations of the strap, that are under the pulling action, causes the retention of the two ends of the strap that are engaged inside the retaining element.

The invention will be further illustrated by reference to the drawings enclosed, in which.

Before proceeding to the illustration of the cable binding apparatus, a description of the indented binding strap and of the indented retaining element, according to this invention will be given.

Figure 1:
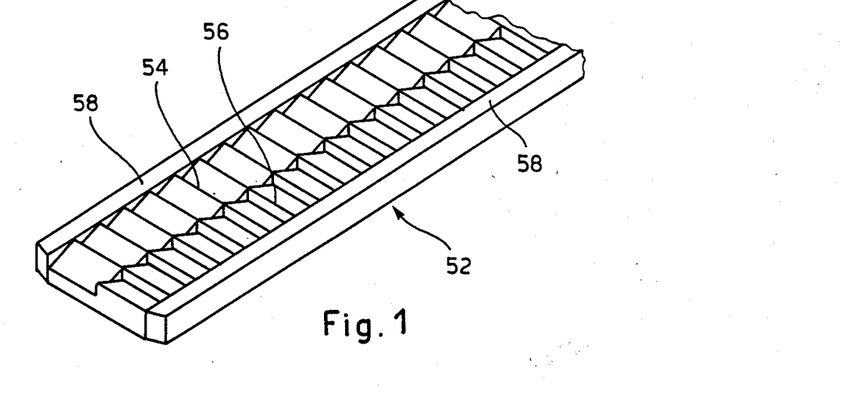
FIG. 1 shows a perspective view of a portion of the indented plastic strap according to this invention.

As shown in FIG. 1, a plastic strap 52 consists of a rectangular, continuous and flexible plastic band one face of which has a longitudinal indentation consisting of a continuous line of teeth or serration 54 that run parallel to a second longitudinal indentation, identical to the first one, but with teeth 56 pointing in a direction opposite to that of teeth 54.

Outside of, and parallel to those two sets of teeth 54 and 56, there are two flat, longitudinal and continuous edges 58 of equal width, which form the lateral guiding elements for the strap and which define the actual and constant thickness of strap 52.

Figure 2:
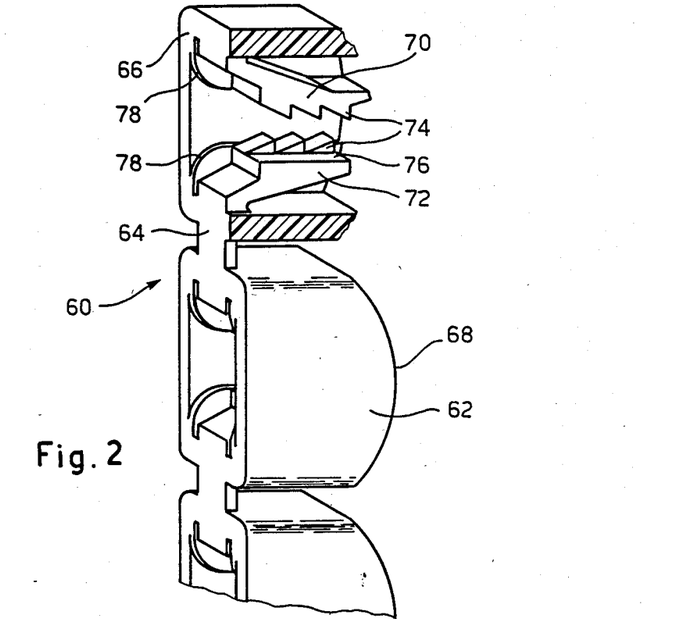
FIG. 2 shows a perspective view of a portion of the strip made of several retaining elements, one of which is shown in cross section.

A strip 60, as shown in FIG. 2, is made up of several retaining elements 62 joined together by means of tongue 64.

Figure 3:
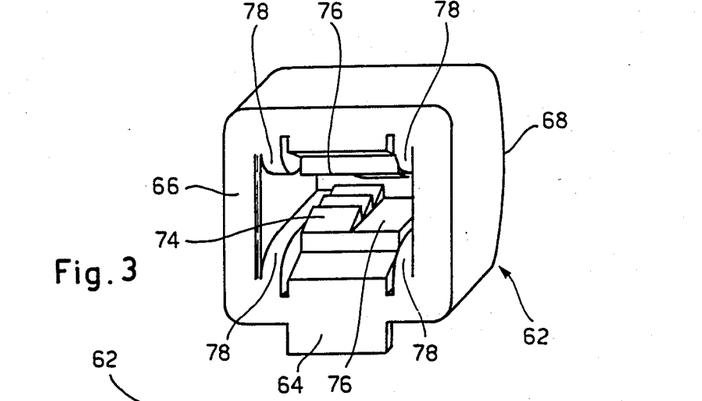
FIG. 3 shows a front perspective view of the retaining element.

The retaining element 62, as shown in FIGS. 2 and 3, has a hollow body with a flat and approximately square face 66, on one side, and an opposing face 68 with a convex or rounded shape. Inside retaining element 62, and starting from the opening of flat face 66, there are two elastic arms 70 and 72 each provided with a set of protruding teeth 74, which are laterally offset with respect to each other; these two sets of teeth take up about half of the width of bending portion of each arm while the other half 76 is free. Teeth 74 are similar to teeth 54 and 56 of strap 52 and are such as to engage them.

Along the sides of bending portions 70 and 72 there are two opposite guiding surfaces 78 that are parallel to the longitudinal axis of the hole of the hollow retaining element and are set at a distance which creates a passage equal to twice the width of strip 52: these guiding surfaces 78 join the front flat face of each element.

Figure 4:
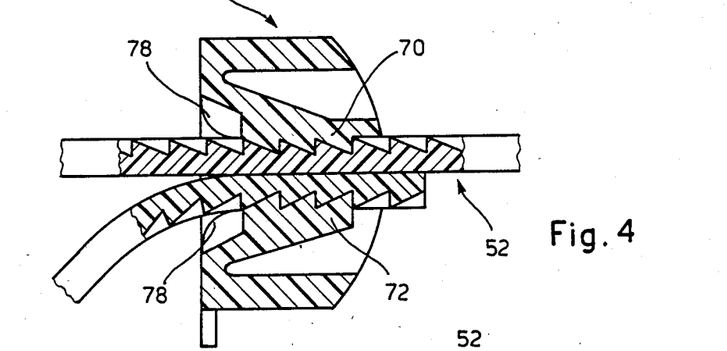
FIG. 4 shows a cross-sectional view of the indented strap, as in FIG. 1, matched with the retaining element shown in FIG. 2.
Figure 5:
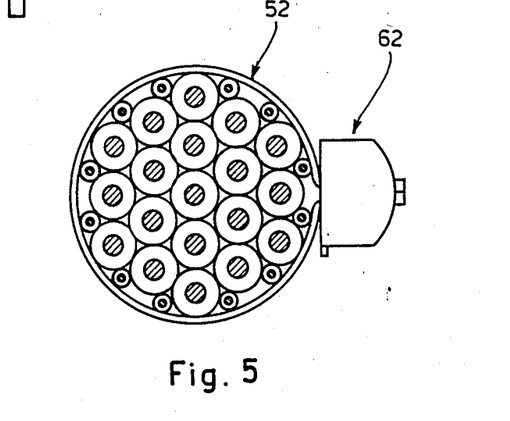
FIG. 5 shows a side view which highlights the two elements of FIGS. 1 and 2 paired and stretched around a bundle of cables.

FIG. 4 highlights the novel aspect of this invention and the figure shows the indented strap 52, twice joined inside retaining element 62, supported by guides 78 with teeth 54 and 56 pointing outwards, and engaged by teeth 74 of the bending portions of elastic arms 70 and 72 so as to obtain the binding of the bundle of cables as shown in FIG. 5.

Figure 6:
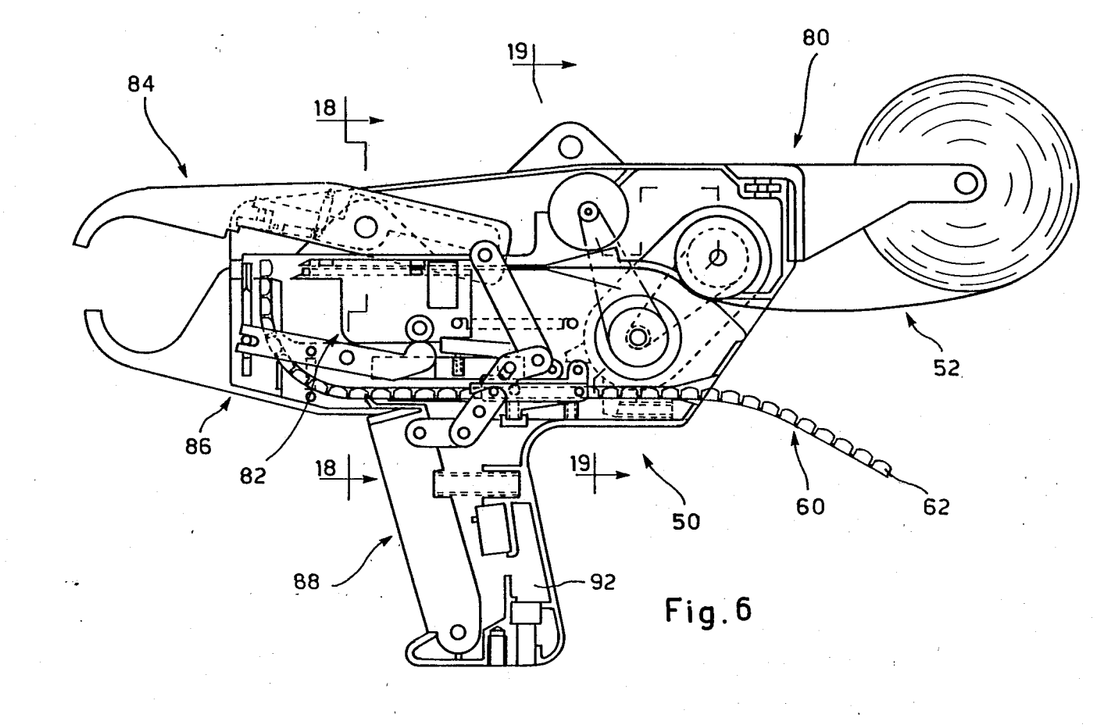
FIG. 6 shows a side view of the automatic apparatus for performing bindings of cables according to the previous figures, where the concept of this invention is put into practice and with one of the two external shells removed.

Viewing now FIG. 6 as a whole, it can be seen that apparatus 50 includes: a mechanism 80 that feeds and pulls the indented strap 52; a mechanism 82 that guides the indented strap 52 and cuts and separates a retaining element 62 from strip 60 pairing it with indented strap 52; a closing device 84 which completes the guiding channel for the indented strap 52 around a bundle of cables to be bound; mechanism 86 for cutting the serrated strap 52; a mechanism 88 which operates the mechanism 84, causing the advance of guiding mechanism 82 and of strip 60 of retaining elements 62.

Figure 7:
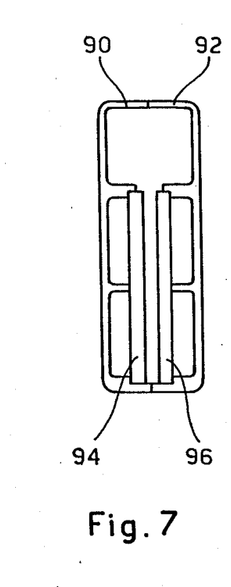
FIG. 7 shows a cross-sectional view of the outer body of the apparatus.

The group of mechanisms 80, 82, 84, 86, 88 are appropriately enclosed in the housing of the apparatus 50 usually made up of two half shells 90 and 92 (FIG. 7) which are approximate mirror images and to which plates 94 and 96, that are also approximately mirror images, are fixed; the two plate-support mechanisms 80, 82, 84, 86 and 88 and provide a running guide for strap 52 and strip 60.

The two half shells 90 and 92 of the housing 50 support, in the rear, a pair of arms 98 placed side by side which hold the reel of serrated strap 52 as shown in FIG. 6. Mechanism 88 that operates the apparatus, as better shown in FIG. 8, includes a lever 100 pivoted around pin 194 and linked by element 102 to two paired levers 104 pivoted around pin 106 attached to plates 94 and 96. Levers 104 are attached, through a slot and by means of pin 108, to a carriage 110 running inside a guide worked into plates 94 and 96.

Figure 8:
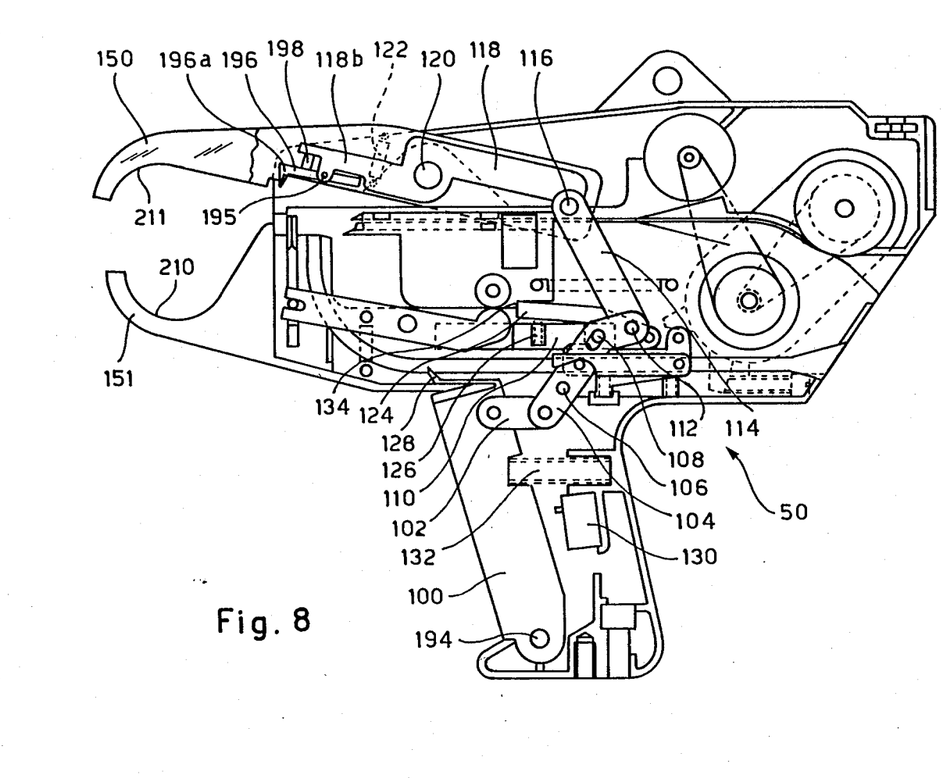
FIG. 8 shows a side view of the automatic cable binding apparatus showing the interacting leverages of the mechanisms that actuate the binding cycle.

Levers 104 are also connected, by means of pins 112, to connecting rods 114 that are connected, through pins 116, to lever 118 which, in turn, rotates around pin 120 fixed across plates 94 and 96 and is connected to closing mechanism 84, as explained further on.

On carriage 110 there is a rocking lever 124 held upright by spring 126.

Lever 124 fits into recess 134 of mechanism 82 to provide a forward push to mechanism 82 itself.

On top of lever 100, there is an elastic tooth 128, which pushes forward the strip 60 of retaining elements as will be explained later.

Inside the two half shells 90 and 92, in the portion that forms the hand-grip, there is an electric push-button switch 130 triggered by lever 100.

Lever 100 is held in the normal position of FIG. 8 by the outward push exerted by spring 132.

Figure 9:
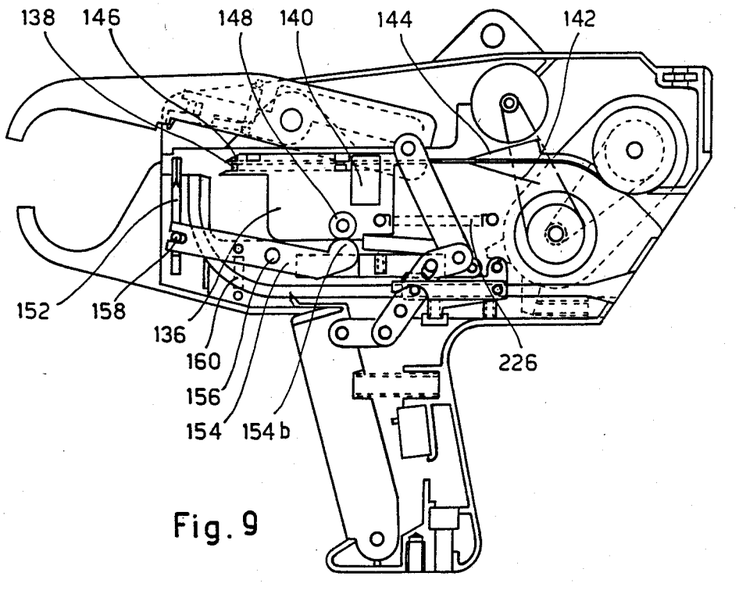
FIG. 9 shows a side view of the cable binding apparatus which highlights the mechanisms for guiding and cutting the indented strap and for separating and positioning the retaining element.
Figure 10:
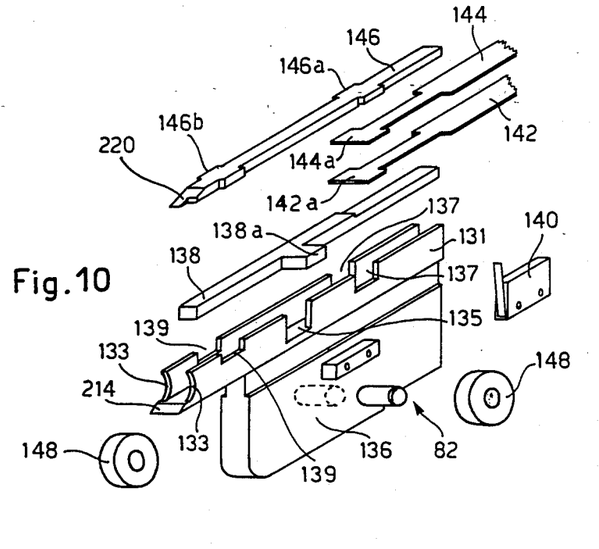
FIG. 10 shows a perspective and enlarged view of a detail of FIG. 9.

Mechanism 82, which guides the indented strap 52 and which positions each retaining element 62 on the forward end of strip 60, is better shown in FIGS. 9 and 10. Mechanism 82, includes carriage 136 which runs inside a guide, not shown, worked out of plates 90 and 92.

Above the carriage 136, there is a channel-shaped element 131 (FIG. 10) which protrudes from the carriage 136 and terminates with a knife-like cross lip 214 and with convex outmost edges 133 of the side walls to fit convex face 68 of retaining elements 62, as it will be explained later. The channel element 131 of the carriage serves many fucntions and, in particular, aside from cutting and positioning the retaining elements 62, it retains a sliding rod 138 provided with a side arm 138a protruding from one side of channel 131 through a wider opening 35 for activating a microswitch 140 located on the same side of carriage 136.

Toward the back of opening 135, the side walls of channel element 131, have openings 137 opposite to each other for engaging the end heads 142a and 144a of two flexible steel bands 142 and 144 which run along guides worked out inside plates 90 and 92 and serve the purpose of guiding the indented strap 52 from the feeding mechanism 80 to carriage 136.

Above guiding bands 142 and 144, inside channel element 131, there is a covering rod 146 provided with lateral wings 146a and 146b set at the proper distance for fitting into openings 137 and 139 on the side walls of the channel 13; the front end of covering rod 146 has its upper face slanted to form a sharp edge 220 which protrudes out of the outermost edges of the side walls of channel 131.

On both sides of carriage 136 there is a roller 148 supported by pin 146.

Closing mechanism 84, as shown in FIG. 8, has a movable upper jaw 150 and a lower fixed jaw 151, with the ends curved toward each other so as to form two guides 210 and 211 which together define an annular channel for guiding the indented strap 52 around a bundle of cables. The upper jaw 150 is freely pivoting around pin 120 of lever 118 which is provided with a protruding arm 118b connected to a return spring 122 hooked to the back extension of movable jaw 150. A counter-acting lever 196 is pivoted at 195 on the front arm 118b of the lever 118, said lever 196 having its front end 196a pointed and turned downwards in the direction of guiding channel 211 inside movable jaw 150: a spring 198 is disposed between the protruding end of front arm 186b and counter-acting lever 196.

Figure 11:
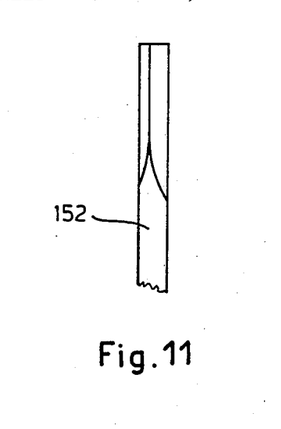
FIGS. 11 and 12 show side and top views of the cutting blade for the indented strap.
Figure 12:
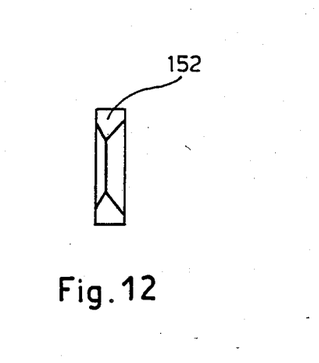

Mechanism 86, for cutting the indented strap 52, better shown in FIGS. 9, 11 and 12, includes a knife 152 which runs vertically inside paltes 94 and 96 with motion imparted by two parallel and opposing rocking levers 154 that turn around pin 156 and provided, at the forward end, with a slot that engages pin 158 of knife 152; two pulling springs 160, attached between levers 154 and the shells of the apparatus pull levers 154 and knife 152 downward. Knife 152, as better shown by FIGS. 11 and 12, has a V-shaped profile for cross-cutting the indented strap.

Mechanism 80, for feeding toothed band 52, as better shown in FIG. 10, includes a low voltage d.c. motor 162 connected, through pulley 164 and toothed belt 166, to pulley 170 of reducer 168. The reducer has an additional toothed pulley 172 connected by toothed belt 174 to a toothed pulley 176 which drives tow discs 180 with edges shaped in the form of teeth to feed indented strap 52 along plane 190 inside of plates 94 and 96, in correspondence with guiding channel 206 to the back inlet of serrated strap 52; reducer 168 and the indented discs are held by a rocking plate 178 which pivots around the axes of the discs and is acted upon by a compression spring 182 placed between a protrusion 222 of the plate and a setting screw 184.

Motor 162 may be of any type such as a motor driven by a fluid under pressure connected to the toothed discs by means of mechanical driving elements.

Figure 13:
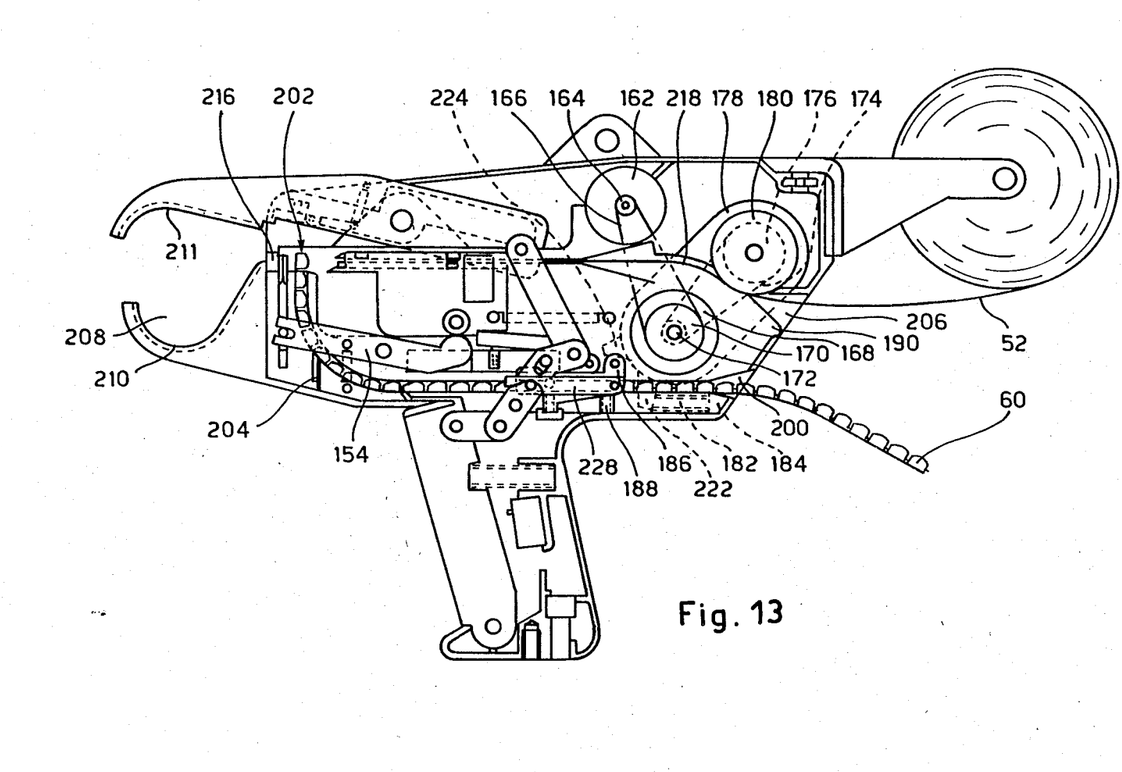
FIG. 13 shows a side view of the automatic cable binding apparatus which highlights the motor-driven mechanism for feeding and pulling the indented strap.
Figure 14:
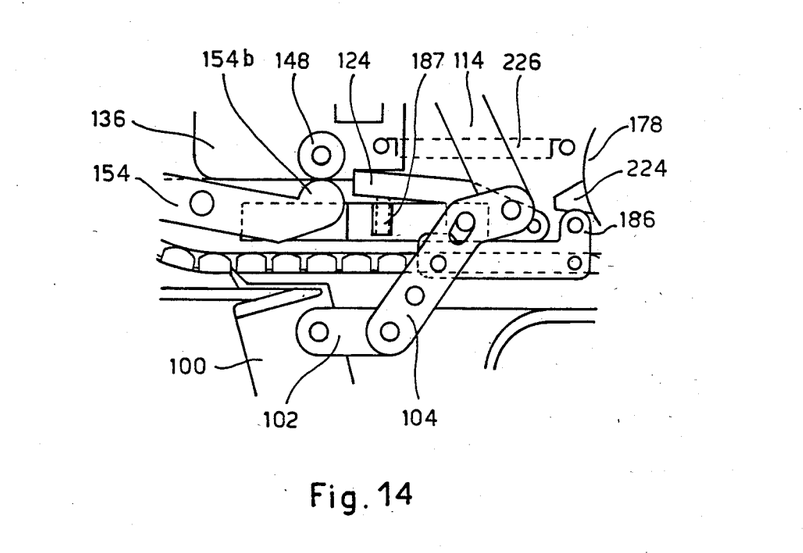
FIG. 14 shows an enlarged portion of FIG. 13.

As shown in FIG. 14, which is an exploded view of FIG. 13, lever 186 for the disengagement of rocking lever 124 acts with its back arm against protrusion 224 of rocking plate 178 while, at the other end, lever 124 has a protrusion 187 that can place itself under a rear pin of rocking lever 124; spring 188 is placed underneath release lever 186.

In general, and according to this invention, a plastic indented strap in the form of a continuous band is made to advance along a guiding channel by initially passing its end through a curved side of a prepositioned retaining element, after having opened up one of its toothed arms for allowing the free advance of the binding strap which moves with its indentation facing outward until it wraps the cable bundle. The binding strap, after completing its turn, is reintroduced with its end into the retaining element through the flat side opposite the preceeding one while the elastic arm is released and the strap is stretched so that the teeth of both arms engage with the teeth of the binding strap. At the same time the indented strap is cut in correspondence with the retaining element.

Referring to FIGS. 6, 7, 8, 9, 10, 13, 14, 15, 16 and 17, it should be clear how the automatic apparatus 50 performs the binding of a bundle of cables.

Strip 60, made up of many retaining elements 62, as FIG. 14 shows, is inserted by the operator into guiding channel 200 and is pushed until it stops at 202, while spring 204 keeps strip 60 from backing up.

The operator insert band 52, as shown in FIG. 14, into guiding channel 206 until it becomes engaged under the teeth of serrated discs 180.

The apparatus is ready to operate once strip 60 and band 52 have been positioned.

When a bundle of cables is positioned within working area 208, by pressing lever 100, the lever 106 will rotate sequentially.

As lever 106 rotates, carriage 110 advances and lever 114 lifts.

Carriage 110 will cause the carriage 136 to advance by means of rocking lever 124 as engaged by recess 134. When lever 114 lifts, lever 118 will rotate around pin 120.

As lever 118 rotates it will pull behind, by means of spring 122, the jaw 150 which lowers and closes the binding area while channels 210 and 211 will come into contact to provide a continuous guide for band 52.

The rotation of lever 118 and, hence, the closing of jaw 150, will lower lever 196.

As carriage 136 advances while pushed by carriage 110, cam 154b of lever 154 becomes disengaged.

As lever 154 lifts under the action of springs 160, knife 152 lowers.

The advance of carriage 136 and the lowering of knife 152 are synchronized so that, as carriage 136 advances, knife 214 cuts the plastic portion 64 while an element 62 becomes separated and transferred, through the action of convex ends 133 of channel 131 (FIG. 16) into a mating position 226 (FIG. 14) with band 52.

As carriage 136 advances, as it is pushed by lever 124, it pulls the flexible steel elements 142 and 144 which run inside the guides of plates 94 and 96.

It is the function of the flexible elements 142 and 144 to provide a continuos guiding channel for the band 52, which would otherwise be interrupted, from the position of carriage 136 when it is completely drawn in at rest, to its all-advanced position during operation.

Element 62, when pushed into position 216, lifts and then lowers lever 196 which is used to hold element 62 in position with its pointed end 196a; when lever 100 reaches the end of its stroke it activates microswitch 130 which, in turn, sets motor 162 into motion.

As motor 162 turns clockwise, as shown in FIG. 14, its motion is transmitted to reducer 268 by means of toothed belt 170. Reducer 170 transmits its motion through toothed belt 174 to the toothed wheels 180 with enough torque for pushing and then drawing band 52 so as to achieve the binding of the bundle of cables.

The opposing teeth of toothed wheels 180 engage the teeth of strap 52 while the toothed wheel which pushes the line of teeth 54 of band 52 move it along channel 218 and through the channel of carriage 136.

Figure 17:
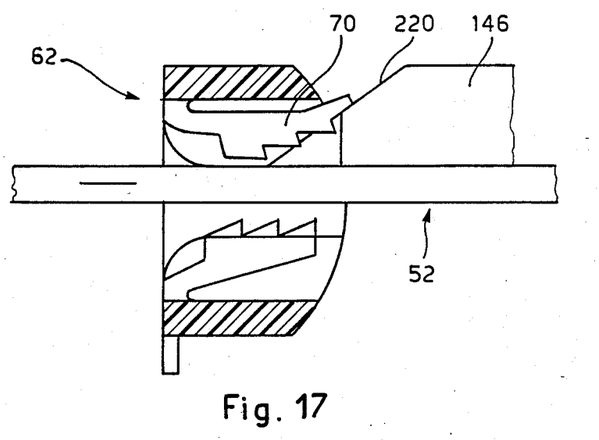
FIG. 17 shows a sectional view highlighting the lifting action of a bending portion of the retaining element of FIG. 2, that follows the shifting of the carriage shown in FIG. 10.
Figure 18:
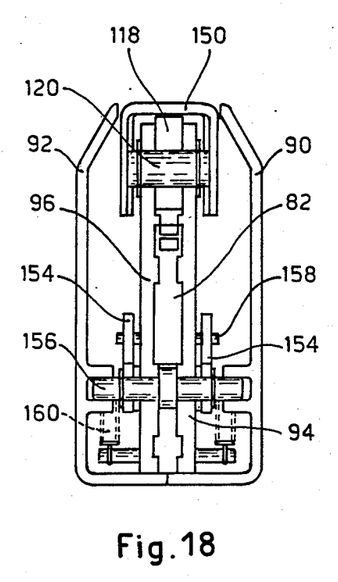
FIG. 18 shows a sectional view of the automatic cable binding apparatus along line 18—18 of FIG. 6.
Figure 19:
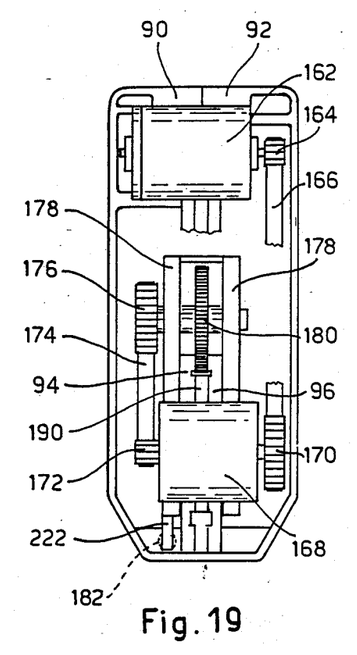
FIG. 19 shows a sectional view of the automatic cable binding apparatus along line 19—19 of FIG. 6.

Carriage 136, while bringing element 62 into position 216 by means of tip 220 of element 146, causes the bending portion 70 of element 62 to lift, as seen in FIG. 17, so that the indented strap runs freely through the central seat of element 62 and along channel 210 of binding area 208; the indented strap runs until its end reaches element 62 as it runs again, in the opposite direction, through the central seat of element 62 and stops against part 138 while engaging the teeth of portion 72 of element 62 as shown in FIG. 11.

After having completed its turn around the bundle of cables, the tip of band 52 hits the front end of element 138 and pushes it backwards causing the intervention of microswitch 140.

When microswitch 140 is turned on, motor 162 reverses direction and, hence, toothed wheels 180 turn in the opposite direction as well.

Toothed wheel 180 with its teeth engaged for the reversal of motion to the line of teeth 56 of strap 52, pulls the strap so as to obtain the binding as shown in FIG. 12.

Figure 16:
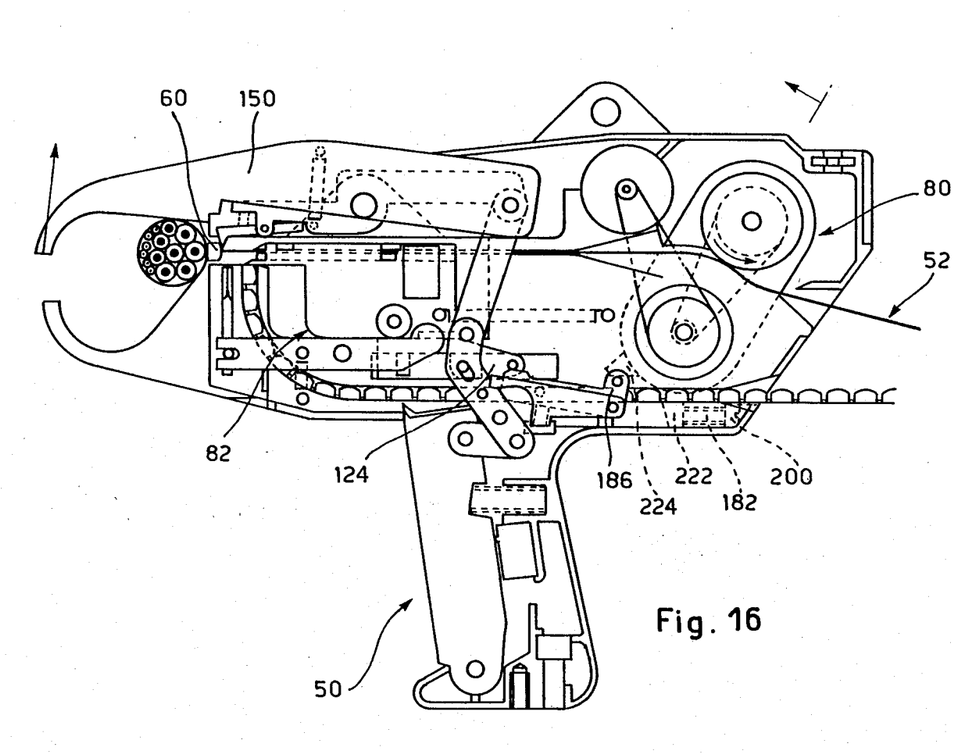
FIG. 16 shows a side view of the automatic cable binding apparatus which highlights the binding of cables, as obtained with the motor-driven mechanism during pulling and before the splicing that separates the indented strap.

As it appears from FIG. 16, the binding action causes the partial opening of jaws 150 and 151 so that, as jaw 150 rotates around pin 116 it moves upward allowing the bundle cables to gather against retention element 62.

The opposing force due to the binding action, while the motor 162 is still turning, causes an anticlockwise rotation of rocking plate 178, as shown in FIG. 16.

The pull exerted by the movement of rocking plate 178, brings element 222 against spring 182 and determines the tension of the binding.

By adjusting the screw 184, the binding tension can be set to the desired value.

As rocking plate 178 (FIG. 16) rotates, element 224 forces lever 186 to move down.

Lever 186, in turn, causes lever 124 to move downward. As lever 124 moves down, carriage 136 becomes disengaged and due to the pull exerted by spring 226, resumes its rest position leaving the binding portion 70 free to engage the teeth of strap 52.

Carriage 136, on its back travel, sets lever 154 into motion by means of rollers 148. Levers 154 lift the knife 152 which, because of its profile (FIGS. 11 and 12) cuts a V-shaped groove into serrated strap 52 that offers its notches to the next cycle.

The V grooves in strap 52, because the motor is still turning, pull the band causing the retrun of the rocking plate and the motor to stop.

When the operator releases lever 100 which is pushed by spring 132, levers 102,106,110,114 and 118 return to their position and jaw 150 opens completely so that the completed binding is made free for removal.

Figure 15:
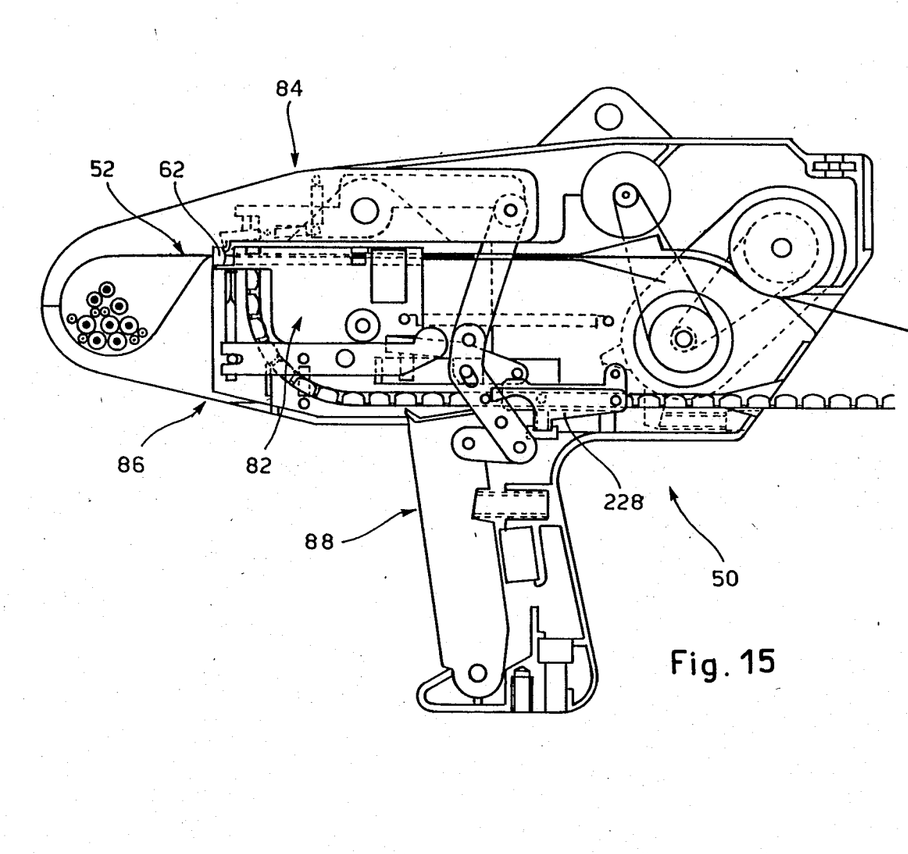
FIG. 15 shows a side view of the automatic cable binding apparatus, which highlights the interacting leverages in their working position with the indented strap of FIG. 1 the strap being shown in its advanced position and through the retaining element of FIG. 3, separated from the strip and positioned within the joining area.

When lever 100 is automatically released because of mechanism 128, strap 60 is pushed upward thus preparing a new retaining element 62 for the next binding cycle. A ratchet element 228, as shown in FIGS. 13 and 15, acts in such a way that when lever 100 is pressed, at the start of a new cycle, it remains in this position even if the operator does not keep it pressed, in as much as lever 104 is prevented from rotating.

This way the cycle has to perform all of the steps required for a complete binding.

Lever 100 is released the moment the rocking plate 190, by means of its protruding part 224, presses upon lever 186.

Upon the release of lever 100 the operator, because of the push exerted by spring 132, is made aware that the working cycle is being completed.

A microswitch, not shown in the attached drawings, is turned on by rocking plate 190 to a position of total pull of band 52.

Turning on the microswitch produces a signal that will bring motor 162 to a halt.

The automatic binding apparatus may be powered by a supply unit with rechargeable batteries which makes it possible for the apparatus to be used where electrical power is not available. The automatic apparatus may also be fed by a supply unit connected to the network so that it may be used uninterruptedlly.

What is claimed is:

1. A cable binding device comprising in combination a plastic tightening strap of indeterminate length having longitudinal guide edges, and locking elements that are engageable with a length of said strap which is passed around a bundle of cables, said tightening strap having one side provided with first and second sets of transverse indentations that are longitudinally arranged, each of said locking elements comprising a hollow body having a through hole for receiving a double thickness of said strap, and strap retaining arms facing each other and resiliently mounted inside said hollow body, each of said arms having a longitudinal guide surface and parallel locking teeth for engaging one said set of indentations on said strap, the guide surface and the locking teeth of one arm being positioned laterally oppositely on one arm than on the other arm so that the locking teeth on one said arm engage a different set of transverse indentations than the locking teeth on the other arm.

2. An automatic apparatus for forming separate bindings around a bundle of cables or the like in which the binding of the cables is formed by a plastic strap having a longitudinal axis and two sets of indentations arranged parallel to said axis, said plastic strap being continuously fed to the binding apparatus, a toothed retaining element provided in a strip made of several interconnected retaining elements, said apparatus including: a reversible feeding mechanism for feeding and drawing the plastic strap; guiding means for guiding the plastic strap toward a looped guiding path encircling a bundle of cables, cutting means for cutting a retaining element from said strip and positioning the same in alignment with said path, and means for cutting the indented strap, said cutting means and feeding mechanism being operatively connected to act sequentially; a body provided with fixed and movable jaws having a guiding channel for the indented strap defining said looped path for the strap encircling the bundle of cables; means for guiding and for step-feeding each individual retaining element from said strip in a first operative position in close vicinity to said looped path for the indented strap; second guiding means for providing a path for the indented strap and for feeding the same along a linear path from a rear inlet aperture to said looped path, said second guiding means including a carriage running along said linear path to move said retaining element from said first to a second operative position in line with the ends of said guiding channel control means, acting in sequence to hold the carriage in a forward position while the indented strap is made to advance through the retaining element and along said looped path, and a stop memeber to stop the front end of the strap after it has passed again in an opposite direction through the retaining element, said stop member being supported and allowed to slide by the carriage, and operative means to cause reverse pulling action of the strap by said second guiding means, sensing means for sensing return motion and stretching of the strap, control means acted on by said sensing means to allow for return movement of the carriage, and a cutting device actuated by the control means for cutting the indented strap in correspondence with the retaining element.

3. An apparatus, as claimed in claim 2, in which the step feeding means for the retaining elements comprises a pushing member elastically supported by a control lever and an elastic retaining member for the strip of retaining elements, said retaining member acting in a direction opposite to the pushing member.

4. An apparatus, as claimed in claim 2, comprising a pair of elastic bands connected to said carriage for guiding the indented strap along said linear path.

5. An apparatus, as claimed in claim 2, in which the indented strap-feeding means comprises a pair of toothed discs engaging the indented strap, said discs being connected to a control motor by means of a reducer.

6. An automatic apparatus for the binding of cables, as claimed in claim 2, in which the driving means for pushing and pulling the indented strap are carried by a rocking plate and comprises an adjustable spring means, acting on the rocking plate, for adjusting the binding force.

7. An automatic apparatus for binding cables, as claimed in claim 6, in which the plate supporting the driving means for pushing and pulling the strap is operatively connected to an engaging and disengaging member for the above mentioned carriage.

8. An automatic apparatus for cable binding, as claimed in claim 7, in which the carriage for guiding the indented strap comprises support and cutting means for separating a retaining element from said strip in the first operative position; a stop member slidibly supported by said support means; a lower and an upper flexible guide members extending backwards from the support means as an extension of said linear guide for the indented strap; means for opening the toothed arms of the retaining element for the indented strap and cutting means operativelly connected for actuating a cutting device for the indented strap.

9. An automatic apparatus for cable binding, as claimed in claim 8, including a sensing device activated by said stop member which initiates the pulling action of the strap.

10. An automatic apparatus for cable binding, as claimed in claim 8, in which the carriage for the guiding means is operatively connected to the cutting device for the indented strap.

11. An automatic apparatus for cable binding, as claimed in claim 10, in which the cutting device comprises a V-shaped cutting edge to cut the sides of the indented strap with a V-shaped profile end for reintroducing said strap into a retaining element during a successive cycle of a binding operation.

12. An automatic binding apparatus for forming a tightening strap of indeterminate length into a loop around a bundle of cables and locking the loop with a locking element that is cut from a row of locking elements, each locking element having opposed resilient arms provided with guide surfaces and teeth for engaging indentations in the strap, said apparatus comrpsing:
a body having upper and lower jaws defining a space between them, at least one of said jaws being pivotably connected to said body, said jaws having guide channels for said tightening strap, first feeding means for feeding and tightening said strap, second feeding means for feeding and positioning each of said locking elements in alignment with the guide channels in the jaws for engaging the same with a strap tightened against the bundle of cables, said second feeding means comprising a guide channel in the body opening near an end of the guide channel of a jaw and pushing means for advancing said locking elements towards the jaws, said first and second feeding means including a guiding carriage for said strap, said carriage being provided with a channel sahped guide element having a protruding cutting edge and forwardly located shoulder surfaces for cutting and supporting a locking element, said carriage being movable between a retracted position and an advanced position to cut a locking element from said row and position the same in alignment with the guide channels in the jaws; a retractor device on said carriage for retracting at least one of the resilient arms of the locking element, sensing means on said carriage for sensing and stopping a leading end of a strap emerging from said locking element, second cutting means for cutting the strap immediately behind a locking element; a manually actuable control lever operatively connected to said pivotable jaw, said carriage and said second cutting means; the apparatus having electrically actuated and reversible power means, and switch means actuated by said control lever and by said sensing means to control forward and reverse movement of the tightening strap.

13. An apparatus according to claim 12, said first feeding means for the strap including guiding means providing a sliding path extending from a rear inlet aperture in said body to said jaws.

14. An apparatus according to claim 12 in which said guiding means for the strap includes superimposed elastic strips connected to said carriage.

15. An apparatus according to claim 14 in which said strip and said sensing means are provided in a channel shaped protrusion of said carriage, said protrusion comprising a cutting edge and front shoulder surfaces for resting a locking member at a front end of the carraige.

16. An apparatus according to claim 12 in which said strap sensing means includes a movable sensing member slidably supported by said carriage.

17. An apparatus according to claim 16 in which said strip and said sensing means are provided in a channel shaped protrusion of said carriage, said protrusion comprising a cutting edge and front shoulder surfaces for resting a locking member at a front end of the carriage.

18. An apparatus according to claim 12 in which said strip and said sensing means are provided in a channel shaped protrusion of said carriage, said protrusion comprising a cutting edge and front shoulder surfaces for resting a locking member at a front end of the carriage.

19. An apparatus according to claim 12 in which said second cutting means is operatively connected to said guiding carriage.

20. An apparatus according to claim 12 in which said pushing means includes a pushing member elastically supported by said control lever, and an elastic retaining member for said interconnected locking elements, said retaining member acting in an opposite direction to the pushing member.

21. An apparatus according to claim 12 in which said power means for feeding and tightening said strap inlcudes a pair of toothed discs engaging the indented strap, said discs being connected to an electric motor by means of a reducer.

22. An automatic apparatus as claimed in claim 12, in which the electrically actuated power means includes driving means for forward pushing and back pulling said strap which are carried by a rocking plate and further includes adjustable thrust biasing means operatively connected to the rocking plate for adjusting the binding force.

23. An automatic apparatus as claimed in claim 22 in which said rocking plate supporting the driving means for pushing and pulling the strap is operatively connected to an engaging and disengaging member for the carriage.

24. An automatic apparatus as claimed in claim 12, in which said second cutting means includes a V-shaped cutting edge to cut the sides of the tightening strap with a V-shaped profile.

* * * * *